Figures 3, 4:
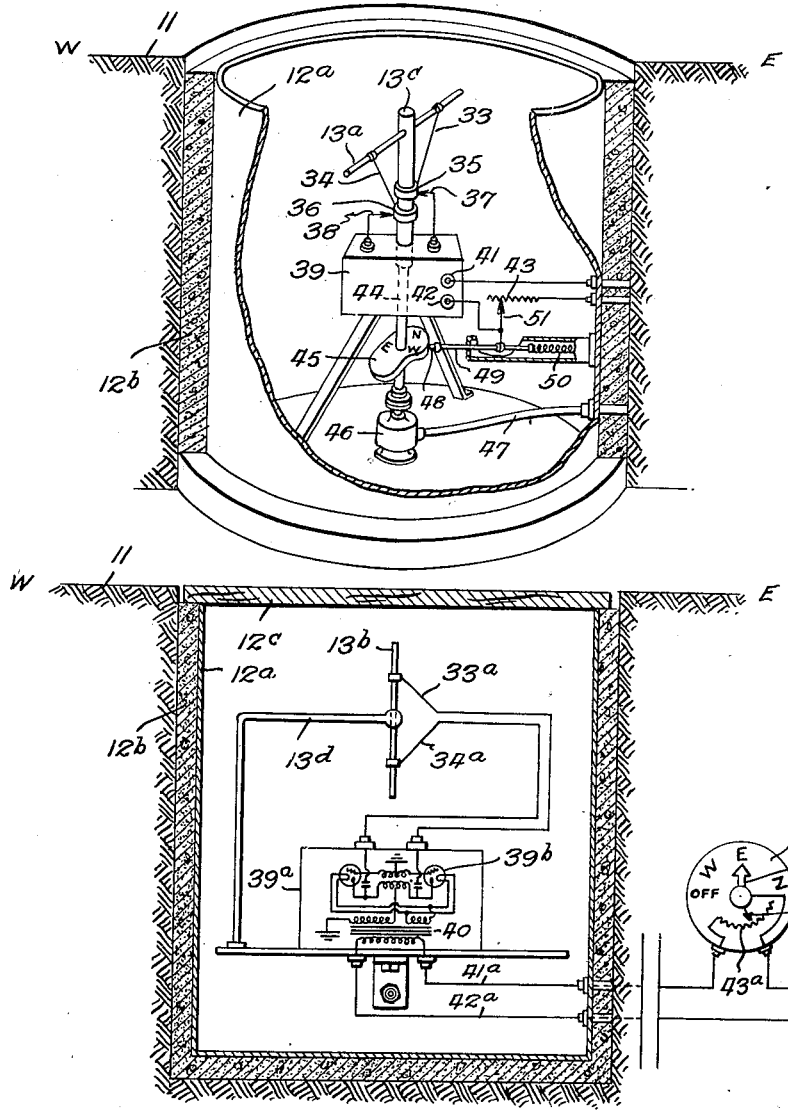

Jan. 4, 1938.　　　F. W. DUNMORE　　　2,104,028
AIRCRAFT BLIND LANDING BEAM SYSTEM
Filed March 3, 1936　　　2 Sheets-Sheet 1
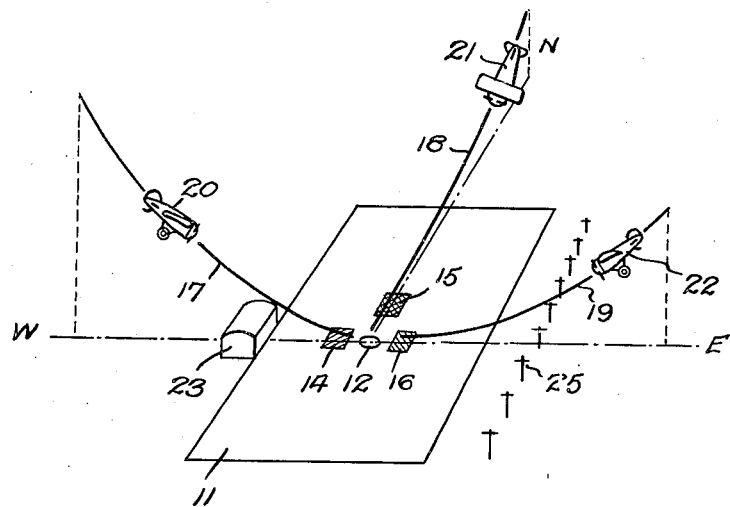
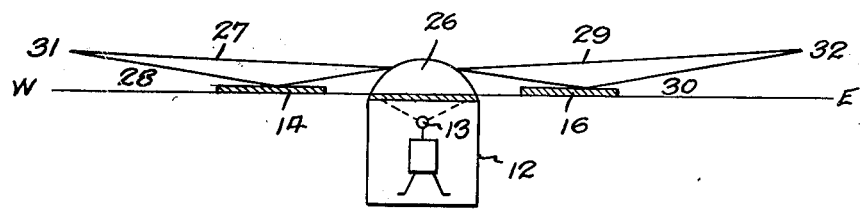
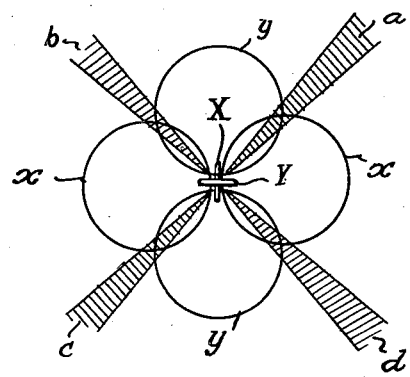
INVENTOR
F. W. DUNMORE
ATTORNEY Jan. 4, 1938.　　　　F. W. DUNMORE　　　　2,104,028
AIRCRAFT BLIND LANDING BEAM SYSTEM
Filed March 3, 1936　　　2 Sheets-Sheet 2

INVENTOR
F. W. DUNMORE
ATTORNEY

Patented Jan. 4, 1938

2,104,028

UNITED STATES PATENT OFFICE 2,104,028

AIRCRAFT BLIND LANDING BEAM SYSTEM

Francis W. Dunmore, Washington, D. C., assignor to The Government of the United States of America, as represented by the Secretary of Commerce Application March 3, 1936, Serial No. 66,977

32 Claims. (Cl. 250—11)

(Granted under the act of March 3, 1883, as amended April 30, 1928; 370 O. G. 757)

The invention described herein may be manufactured and used by or for the Government of the United States for governmental purposes without the payment of any royalty thereon.

This invention relates particularly, but not exclusively to so-called glide path or landing beam systems, and aims generally to improve the same.

One system of the type mentioned, in connection with which this invention is illustrated herein, employs the propagation of a short wave signal, as by means of a horizontal half-wave doublet antenna positioned near the ground surface and connected to suitable transmitting equipment, which signal, in planes normal to the axis of the antenna, assumes an effective shape providing a sloping path of maximum intensity extending upwardly and outwardly from the antenna, with generally parabolic paths of constant signal intensity below this maximum intensity line, which may be followed by an aircraft provided with suitable means for receiving the signal having its output connected to means indicating increase or decrease of signal with reference to the value of the constant intensity path it is desired to follow.

Another system of this type may simultaneously provide for vertical and horizontal guidance, and may be exemplified by two directional wave propagating means oriented at suitable angles, propagating waves of the same radio frequency but of different modulations or characteristic codings, so that their planes of intersection, i. e., in which their respective signals overlap, may be used as equisignal zones for lateral guidance of an aircraft while the lines of constant field intensity in such planes may be used as glide paths for the vertical guidance of the aircraft.

A third illustration of the type of system mentioned, to which this invention is particularly, but not exclusively adapted, may employ a vertically positioned doublet antenna, which generates a non-directional glide beam.

In order to serve all wind directions with a single apparatus or landing beam installation of the type illustrated by the above-mentioned examples, such installation may be made near the center of the landing area, in a covered pit, just below the ground surface, and where a directional installation is used, it may be directionally oriented by rotating it about a vertical axis, preferably by remote control means, to present its servicesignal zone in the direction to be served.

The present invention aims to improve systems of the above nature by providing the proper shape of glide path for different directions of approach presenting different obstructional characteristics, from a given transmission system, preferably located in a pit near the center of the landing area.

Briefly, my improvement comprises the method of and means for shaping a glide path by changing the slope of the glide path to accord with the conditions, as the obstructional characteristics, of the terrain in the direction to be served; and my invention contemplates various methods and means of this generic nature, used either singly or in various combinations.

Examples of my improved methods and means, more particularly set forth in the following detailed description as illustrative of my invention, involve propagation of a radiated field providing vertical guidance courses and for serving different directions, which radiated field may be non-directional or directional and rotatable to serve different directions, and modification of the slope of the courses propagated in the different directions to be served,—or more particularly, modifying the reflection coefficient of the ground surface underlying the courses in different directions (so as to increase or decrease cancellation of directly propagated waves by the reflected waves of reversed phase) or modifying the intensity of the radiated field as a whole for different directions to be served, or both,—in accordance with the obstructional characteristics of the particular direction to be served, thus to so shape the glide path in each direction as to insure that the aircraft following it will clear all ground obstacles (hills, hangars, trees, etc.) in that particular direction.

Other particular features and objects of my invention will be apparent from the following detailed description and accompanying drawings of such illustrative examples. It is expressly understood, however, that these particular embodiments are to be construed purely as illustrative of my invention and not as restrictive upon its scope.

Referring to the accompanying drawings:—

Fig. 1 is an exaggerated diagrammatic representation of a section of terrain including a landing area, illustrating by example, different obstructional characteristics in different directions relative to the landing area, and illustrating an application of embodiments of this invention; while with reference to plane E—W of Fig. 1, Fig. 2 is an exaggerated diagram illustrating the method and means of one embodiment of this invention;

Fig. 3 is an exaggerated diagrammatic perspective partly in section illustrating the method and means of another embodiment of this invention; and Fig. 4 is an exaggerated diagram illustrating a second application of the invention; Fig. 5 being a further diagram exemplifying further application of the invention.

Referring to the drawings more in detail, in Fig. 1 there is represented an airport 11 provided with a landing beam transmitter, preferably housed in a pit 12 near the center of the landing area 11. The landing beam transmitter may be of any suitable type, for example, of the doublet-type disclosed in the copending application of Harry Diamond and Francis W. Dunmore, Ser. No. 37,930, filed August 26, 1935, and the pit may also be of any suitable construction, preferably of the construction disclosed in the said copending application. Furthermore, the transmitter may be either of a non-directional type, as with a vertical doublet antenna (see Fig. 4), or of a directional type serving different directions, as with a horizontal doublet rotatable to different positions about a vertical axis (see Figs. 2 and 3).

In accordance with one embodiment of this invention, surfaces 14, 15 and 16, Fig. 1, are treated to give them different reflecting coefficients for the landing beam wave, preferably an ultra-high radio frequency wave, say of the order of three meters wavelength, in accordance with the disclosure of the above-noted copending application. This treatment may be effected by placing on the ground surface or close to it, media of the desired reflecting coefficients, in the areas with which the major reflected components of the wave picked up by the aircraft have incidence, as more fully described hereinafter.

Examples of such media on the one hand are metallic reflectors as copper screening or sheeting, which has a high reflective coefficient, so that its introduction has the effect of increasing the intensity of the reflected wave of reversed phase thus increasing the cancellation of direct signals by reflected signals at points in that part of the radiated field employed in following a constant intensity landing course, and thus raising the given constant intensity course; and on the other hand non-metallic and dielectric materials, such as smooth concrete, which has a low reflective coefficient, producing less cancellation, and lowering in effect the given constant intensity course.

Thus in the diagrammatic showing, Fig. 1, as indicated by different cross-hatchings, the area constituting reflector 14, in the direction in which a high landing path slope is desired, is paved or otherwise treated with a medium of high reflective coefficient, increasing cancellation and making it necessary for the approaching aircraft 20 to fly higher in following a course of given constant intensity 17, insuring that the aircraft 20 approaching from the direction "W" will clear the hangar 23; reflector 15 produces normal landing paths as indicated by the representative path 18 for an airplane 21 coming in without ground obstructions, from the direction "N"; and reflector 16 has a reflection coefficient such that it produces landing paths, as indicated by representative path 19, sufficiently steep so that airplane 22 coming in from the direction "E" will clear the power lines 25. In this way all directions of approach may be served with the desired landing path.

Referring to Fig. 2, illustrating diagrammatically the embodiment of method and means just described, there is diagrammatically shown in cross-section in the E—W direction (Fig. 1) the landing field 11, the pit 12 with transmitting antenna 13 and reflectors 14 and 16. For purposes of illustration a horizontal doublet antenna 13, as in Fig. 3, is shown, oriented with its axis normal to the plane of Fig. 2, as in serving the E—W directions, Fig. 1. As set forth in the above-noted copending application, the expanding wave front 26 constitutes a new source of energy which consists of direct rays 27 and 29 and reflected rays 28 and 30.

The field strength at 31 is the vector sum of 27 and 28. As 28 is 180° out of phase with 27 due to reflection the field strength at 31 will be in large part a function of the coefficient of reflection of surface 14. Reflector 14 is such that rays 28 and 27 will more nearly cancel than rays 29 and 30. Therefore an airplane with a fixed receiving set sensitivity will follow a higher landing path (to produce a given signal output) when coming in from the direction of the resultant of rays 27 and 28, than it will when coming in from the direction of the resultant of rays 29 and 30. In other words, to get the same field strength the airplane must be higher in the direction of 31 than in that of 32. This is shown in Fig. 1. For the purposes of illustration a single point source on wave front 26 has been taken to produce rays 27 and 28 and another for rays 29 and 30. It is understood, however, that the resultant field strengths at 31 and 32 are the integral of all points along 26 as well as other wave fronts leaving the pit.

Still referring to Figs. 1 and 2, a second mode of changing the field strength at points 31 and 32 is to increase or decrease the intensity of the propagated beam at the antenna 13, and a third way in which the method of modifying the effective course height may be accomplished consists in using the combined effects of reflecting means, as 14, 15 and 16, together with change of propagated beam intensity. This third way of practicing the invention is particularly useful when it is desired to serve two course directions at once, in which case, for direction "W", say, the reflecting means may be employed, together with the beam strength determined for serving direction "E", to produce the desired course elevations in direction "W".

Referring to Fig. 3, there is shown therein an embodiment of means which may be employed, for example, in the pit 12 (Fig. 1) for practicing this invention. By way of illustration the pit shown in Fig. 3 is constructed in accordance with the copending application above mentioned and comprises the shielding means 12a and concrete wall 12b, housing the rotatable horizontal doublet antenna 13a, supported by insulating standard 13c and connected through lines 33 and 34 to slip rings 35 and 36. Brushes 37 and 38 connect to the output of ultra-high radio frequency generator 39 of any conventional or other form, such as that shown at 39a (Fig. 4).

Referring briefly to Fig. 4 as illustrating a conventional ultra-high radio frequency generator, the doublet antenna 13b (13a, Fig. 3) is connected through the usual blocking condensers to the plates of transmitting tubes 39b, which are supplied with plate voltage (and filament current in the form indicated) through transformer 40 with its primary connected to power supply lines 41a, 42a (41, 42, Fig. 3).

Referring again to Fig. 3, there is interposed in the power supply lines, herein the line 42, a variable resistor 43, and there is carried by the antenna orienting shaft 44, a cam 45, adapted to be rotated with the antenna as by Selzin motor 46, operated by remote control lines 47, which extend to some remote control point off the landing area. Cam 45 operates against a roller 48 on arm 49 held against cam 45 as by spring 50. Arm 49 carries the variable contact 51 for the resistor 43 so that as antenna 13a is rotated to serve different directions of approach, resistor 43 is increased or decreased, in accordance with the shape of cam 45, by the correct amount to give the proper glide path for the direction of landing being served. For purposes of reference to Fig. 1, the cam is shown of a shape indicated by letters E, N and W to decrease the resistance of resistor 43 when serving the "N" direction, thus increasing the intensity of the propagated signal and lowering the position of a given consant intensity course in the "N" direction; and to increase resistance 43 to the maximum in the "W" direction, and decrease resistance 43 to an intermediate value when serving the "E" direction, to produce correspondng changes in the height at which a plane must fly to receive a given intensity signal in those directions. If it is wished to use power control alone to effect the desired results the cam 45 will be shaped accordingly; if it is wished to use reflectors 14, 15 and 16 (Fig. 1) alone, the cam 45 and elements 43, 49, 50 and 51 will be omitted; and if both are to be used in cooperation with one another, the cam 45 will be shaped to effect the desired adjustments with reference to the terrain modified by the reflectors 14, 15 and 16. As above noted, if it is wished to serve two courses at once, as "E" and "W", the same power setting or position of cam 45 may be used, with the desired differentiation between directions served being effected by differences in the reflecting surfaces 14 and 16.

Referring to Fig. 4, illustrating another application of my invention, there is shown a pit, as pit 12, Fig. 1, made up of shielding 12a, concrete wall 12b and plank cover 12c, supplied with a non-directionally positioned doublet antenna 13b, herein shown as held in a vertical position by insulating standard 13d. The antenna 13b is connected, by lines 23a and 34a, to the output of transmitting tubes 39b, as in the case of Fig. 3, with the power for the radio frequency generator 39a supplied by lines 41a and 42a. In this case, as the non-direction antenna 13b requires no rotation, the resistance 43a is located at the remote control point, and in lieu of the cam 45 operating the element 51, the resistance 43a is calibrated as at "W", "E" and "N", so that setting of pointer 48a to the proper calibration will set the resistance 43a at the value to produce the proper decreased or increased strength of signal, thus raising or lowering the height of a given constant intensity course. As before, with the non-directional antenna 13b the course height modification (Fig. 1) may be effected by power control 45a properly calibrated, by reflectors 14, 15 and 16 properly related, or by the combined use of both.

Referring to Fig. 5, there is illustrated therein another application of the invention. As above noted means may be provided for propagating two or more beams at an angle to one another preferably of the same radio frequency but of different modulations or characteristic codings, to give both vertical and horizontal guidance simultaneously. Various means may be provided for this purpose, as stacked arrays, Yagi arrays or crossed doublets, exemplified in Fig. 5 by the crossed horizontal doublets X and Y respectively radiating fields $x$ and $y$, of the same radio frequency but different characteristics. For example, the signals $x$ and $y$ may be modulated at 65 and 86⅔ cycles respectively, or respectively coded with dots and dashes, providing in planes of intersection $a$, $b$, $c$, and $d$, equisignal horizontal courses with vertical glide beam characteristics, i. e., three dimensional courses. The beam propagating means X and Y may be energized by any suitable means, such as the oscillators shown in Figs. 3 and 4, further provided with modulating or coding equipment of conventional design. The output of beam propagating means X and Y may be controlled in any suitable way, as for example, by controlling the power input as shown in Figs. 3 and 4. Orientation of both antennas may be effected simultaneously, as by the means shown in Figure 3. Further, the reflective coefficient of the terrain may be modified in the directions in which the usable runway course or courses will be employed, as described above with particular reference to Fig. 1. The use of two stacked or Yagi arrays, as above mentioned, will of course provide a single runway course, with vertical guidance characteristics, as $d$, instead of the four courses $a$, $b$, $c$ and $d$.

From the foregoing description it will be apparent that my invention may be embodied in many forms of method and means, and it is understood that reference to the forms disclosed as illustrative of my invention is illustrative only and not to be interpreted restrictively, either in this description or the appended claims.

What I claim is:—

1. In a method for vertical guidance of aircraft with respect to a terrain including a landing area, the improvement which consists in propagating a radiated field providing vertical guidance courses to serve different directions, and imparting predetermined modifications to the slope of the vertical guidance courses propagated in serving different directions coordinating said guidance courses with the obstructional characteristics of the terrain in said directions.

2. In a system for vertical guidance of aircraft with respect to a terrain including a landing area, in combination, means for propagating a radiated field providing vertical guidance courses and for serving different directions, and means for imparting predetermined modifications to the slope of the vertical guidance courses propagated in serving different directions coordinating said guidance courses with the obstructional characteristics of the terrain in the respective directions.

3. In a method for vertical guidance of aircraft with respect to a terrain including a landing area, the improvement which consists in propagating a radiated field providing vertical guidance courses to serve different directions, and modifying the slope of the vertical guidance courses propagated in different directions in accordance with the obstructional characteristics of the terrain in said directions, at least in part by decreasing the intensity of the radiated field and increasing the intensity of the terrain-reflected course-component serving directions in which the obstructional characteristics of the terrain render a greater slope desirable.

4. In a system for vertical guidance of aircraft with respect to a terrain including a landing area, in combination, means for propagating a radiated field providing vertical guidance courses and for serving different directions, and means for modifying the slope of the vertical guidance courses propagated in different directions in accordance with the obstructional characteristics of the terrain in the respective directions, said modifying means including means for increasing the intensity of the radiated field and means for decreasing the intensity of the terrain-reflected course-component serving directions in which the obstructional characteristics of the terrain render a lesser slope desirable.

5. In a method for vertical guidance of aircraft with respect to a terrain including a landing area, the improvement which consists in propagating a radiated field providing vertical guidance courses to serve different directions, and modifying the slope of the vertical guidance courses propagated in different directions at least in part by varying the intensity of the radiated field by amounts predetermined to correspond with the obstructional characteristics of the terrain in the respective directions to be served.

6. In a system for vertical guidance of aircraft with respect to a terrain including a landing area, in combination, means for propagating a radiated field providing vertical guidance courses and for serving different directions, and means for modifying the slope of the vertical guidance courses propagated in different directions in accordance with the obstructional characteristics of the terrain in the respective directions, said modifying means including means for varying the intensity of the radiated field by amounts predetermined to correspond with the obstructional characteristics of the terrain in the respective directions to be served.

7. In a method for vertical guidance of aircraft with respect to a terrain including a landing area, the improvement which consists in propagating a radiated field providing vertical guidance courses to serve different directions, and modifying the slope of the vertical guidance courses propagated in different directions at least in part by imparting to the terrain surrounding the place of radiated field propagation different radiation reflective coefficients in different directions, in accordance with the obstructional characteristics of the terrain in said directions.

8. In a system for vertical guidance of aircraft with respect to a terrain including a landing area, in combination, means for propagating a radiated field providing vertical guidance courses and for serving different directions, and means for modifying the slope of the vertical guidance courses propagated in different directions in accordance with the obstructional characteristics of the terrain in the respective directions, said modifying means including means imparting to the terrain surrounding the radiated field propagating means different radiation reflective coefficients in said different directions.

9. In a method for vertical guidance of aircraft with respect to a terrain including a landing area, the improvement which consists in propagating a non-directional radiated field providing vertical guidance courses serving a number of different directions, and modifying the slope of the vertical guidance courses in a predetermined degree in accordance with the obstructional characteristics of the terrain in the direction to be served.

10. In a system for vertical guidance of aircraft with respect to a terrain including a landing area, in combination, means for propagating a non-directional radiated field providing vertical guidance courses serving a number of different directions, and means for modifying the slope of the vertical guidance courses in a predetermined degree in accordance with the obstructional characteristics of the terrain in the direction to be served.

11. In a method for vertical guidance of aircraft with respect to a terrain including a landing area, the improvement which consists in propagating a non-directional radiated field providing vertical guidance courses serving a number of different directions, and varying the intensity of the radiated field by amounts predetermined to correspond with the obstructional characteristics of the terrain in the direction to be served.

12. In a system for vertical guidance of aircraft with respect to a terrain including a landing area, in combination, means for propagating a non-directional radiated field providing vertical guidance courses serving a number of different directions, and means calibrated and operable to vary the intensity of the radiated field by predetermined amounts coordinated with the obstructional characteristics of the terrain in the direction to be served.

13. In a method for vertical guidance of aircraft with respect to a terrain including a landing area, the improvement which consists in propagating a non-directional radiated field providing vertical guidance courses serving a number of different directions, and imparting to the terrain surrounding the place of radiated field propagation different radiation reflective coefficients in different directions.

14. In a system for vertical guidance of aircraft with respect to a terrain including a landing area, in combination, means for propagating a non-directional radiated field providing vertical guidance courses serving a number of different directions, and means imparting to the terrain surrounding the radiated field propagating means different radiation reflective coefficients in different directions.

15. In a method for vertical guidance of aircraft with respect to a terrain including a landing area, the improvement which consists in propagating a directional radiated field providing vertical guidance courses, turning said directional field to serve different directions with said courses, and varying the effective intensity of the radiated field to modify the slope of the vertical guidance courses in different predetermined degrees in different rotative positions of the courses in accordance with the obstructional characteristics of the terrain in the direction to be served.

16. In a system for vertical guidance of aircraft with respect to a terrain including a landing area, in combination, means for propagating a directional radiated field providing vertical guidance courses, means for rotating said field propagating means to serve different directions with said courses, and means for varying the effective intensity of the radiated field to modify the slope of the vertical guidance courses in different predetermined degrees in different rotative directions of the courses in accordance with the obstructional characteristics of the terrain in the direction to be served.

17. In a method for vertical guidance of aircraft with respect to a terrain including a landing area, the improvement which consists in propagating a directional radiated field providing vertical guidance courses, turning said directional field to serve different directions with said courses, and varying the intensity of the radiated field in different predetermined degrees in different rotative positions of the courses in accordance with the obstructional characteristics of the terrain in the direction to be served.

18. In a system for vertical guidance of aircraft with respect to a terrain including a landing area, in combination, means for propagating a directional radiated field providing vertical guidance courses, means for rotating said field propagating means to serve different directions with said courses, and means for varying the intensity of the radiated field in different predetermined degrees in different rotative directions of the courses in accordance with the obstructional characteristics of the terrain in the direction to be served.

19. In a method for vertical guidance of aircraft with respect to a terrain including a landing area, the improvement which consists in propagating a directional radiated field providing vertical guidance courses, turning said directional field to serve different directions with said courses, and imparting to the terrain surrounding the place of radiated field propagation different radiation reflective coefficients in different directions.

20. In a system for vertical guidance of aircraft with respect to a terrain including a landing area, in combination, means for propagating a directional radiated field providing vertical guidance courses, means for rotating said field propagating means to serve different directions with said courses, and means imparting to the terrain surrounding the radiated field propagating means different radiation reflective coefficients in different directions.

21. In a system for blind landing of aircraft, a landing area, a source of ultra-high radio frequency, a directive antenna energized from said source and located below the surface of said landing area, said antenna radiating energy from said source of ultra-high frequency in directions depending upon its azimuthal position, said radiated energy producing a landing path, remotely controlled rotating means for changing the azimuthal position of said antenna, reflecting means on said landing area surrounding said antenna, said reflecting means having different reflecting coefficient for said ultra-high radio frequency in different azimuthal directions about the said antenna as a center, such that the landing path in different azimuthal directions has predetermined steepnesses.

22. In a system for blind landing of aircraft, a source of ultra-high radio frequency, an antenna with non-directional radiating characteristic in all azimuthal directions, said antenna being energized from said source and located below the surface of said landing area and radiating energy from said source of ultra-high radio frequency, said radiated energy producing landing paths in all azimuthal directions, reflecting means on said landing area surrounding said antenna, said reflecting means having different reflecting coefficient for said ultra-high radio frequency in different azimuthal directions about said antenna as a center such that the landing path in different azimuthal directions has predetermined steepnesses.

23. In a system for blind landing of aircraft, a landing area, a source of ultra-high radio frequency, a directive antenna energized from said source and located below the surface of said landing area, said antenna radiating energy from said source of ultra-high frequency in directions depending upon its azimuthal position, said radiated energy producing a landing path, remotely controlled rotating means for changing the azimuthal position of said antenna, additional means associated with said rotating means for effecting predetermined changes in the power output of said source of ultra-high frequency; such that the landing path in different azimuthal directions has predetermined steepnesses.

24. In a system for blind landing of aircraft, a source of ultra-high radio frequency, an antenna with non-directional radiating characteristic in all azimuthal directions, said antenna being energized from said source and located below the surface of said landing area and radiating energy from said source of ultra-high radio frequency, said radiated energy producing landing paths in all azimuthal directions, remote control means associated with said source of ultra-high radio frequency for varying its power output; such that any of said landing paths may be made a predetermined steepness.

25. In a system for blind landing of aircraft, a landing area, a source of ultra-high radio frequency, a directive antenna located below the surface of said landing area, said antenna being energized from said source and radiating energy from said source of ultra-high frequency in directions depending upon its azimuthal position, said radiated energy producing a landing path, remotely controlled rotating means for changing the azimuthal position of said antenna, reflecting means on said landing area surrounding said antenna, said reflecting means having different reflecting coefficient for said ultra-high radio frequency in different azimuthal directions about the said antenna as a center, additional means associated with said rotating means for effecting predetermined changes in the power output of said source of ultra-high frequency; such that the landing path in different azimuthal directions has predetermined steepnesses.

26. In a system for blind landing of aircraft, a source of ultra-high radio frequency, an antenna with non-directional radiating characteristic in all azimuthal directions, said antenna being energized from said source and located below the surface of said landing area and radiating energy from said source of ultra-high radio frequency, said radiated energy producing landing paths in all azimuthal directions, reflecting means on said landing area surrounding said antenna, said reflecting means having different reflecting coefficient for said ultra-high radio frequency in different azimuthal directions about said antenna as a center, and remote control means associated with said source of ultra-high radio frequency for varying its power output; such that any of said landing paths may be made a predetermined steepness.

27. In a method for guidance of aircraft with respect to a terrain including a landing area, the improvement which consists in propagating to serve different directions radiated fields providing an equisignal zone having sloping glide beam characteristics, and varying the effective intensity of the radiated field to modify the slope of the equisignal zone serving different directions in a manner according with the obstructional characteristics of the terrain in said directions.

28. In a system for guidance of aircraft with respect to a terrain including a landing area, in combination, means for propagating for serving different directions radiated fields providing an equisignal zone of sloping glide beam characteristics, and means for varying the effective intensity of the radiated field to modify the slope of the equisignal zone serving different directions in accordance with the obstructional characteristics of the terrain in the respective directions.

29. In a method for vertical guidance of aircraft with respect to a terrain including a landing area, the improvement which consists in propagating at a source a radiated field nondirectional in horizontal and vertical planes, thus providing directly propagated components and components reflected from the terrain surrounding the source of which the resultants in space produce a field strength beyond one wave length from the source increasing with height to provide a landing path, said propagation thus providing vertical guidance courses serving a number of different directions, and varying the intensity of the radiated field by amounts predetermined to correspond with the obstructional characteristics of the terrain in the direction to be served.

30. In a system for vertical guidance of aircraft with respect to a terrain including a landing area, means for generating at a source a uniform field to provide directly radiated components and components reflected from the terrain surrounding the source of which the resultants in space produce a field strength beyond one wave length from the source increasing with height to provide a landing path, thus providing vertical guidance courses serving a number of different directions, and means operable to vary the intensity of the radiated field in serving different directions by amounts predetermined to correspond with the obstructional characteristics of the terrain in said directions.

31. In a method for guidance of aircraft with respect to a terrain including a landing area, the improvement which consists in propagating for serving several different directions radiated fields providing an equi-signal zone of sloping glide beam characteristics, and modifying the reflective characteristics of said terrain in at least one direction from the source of propagation to provide different reflective co-efficients for said radiated fields in different directions such that the said equi-signal zone of sloping glide beam characteristics will have predetermined different steepnesses in different azimuthal directions.

32. In a system for guidance of aircraft with respect to a terrain including a landing area, in combination, means for propagating for serving several different directions radiated fields providing an equi-signal zone of sloping glide-beam characteristics, reflecting means in proximity to said propagating means in at least one direction from said propagating means, said landing area, by virtue of said reflecting means, having different reflecting co-efficients for said radiated field in different azimuthal directions about said propagating means as a center such that said equi-signal zone of sloping glide beam characteristics will have a predetermined different steepness in different azimuthal directions.

FRANCIS W. DUNMORE.